UNITED STATES PATENT OFFICE.

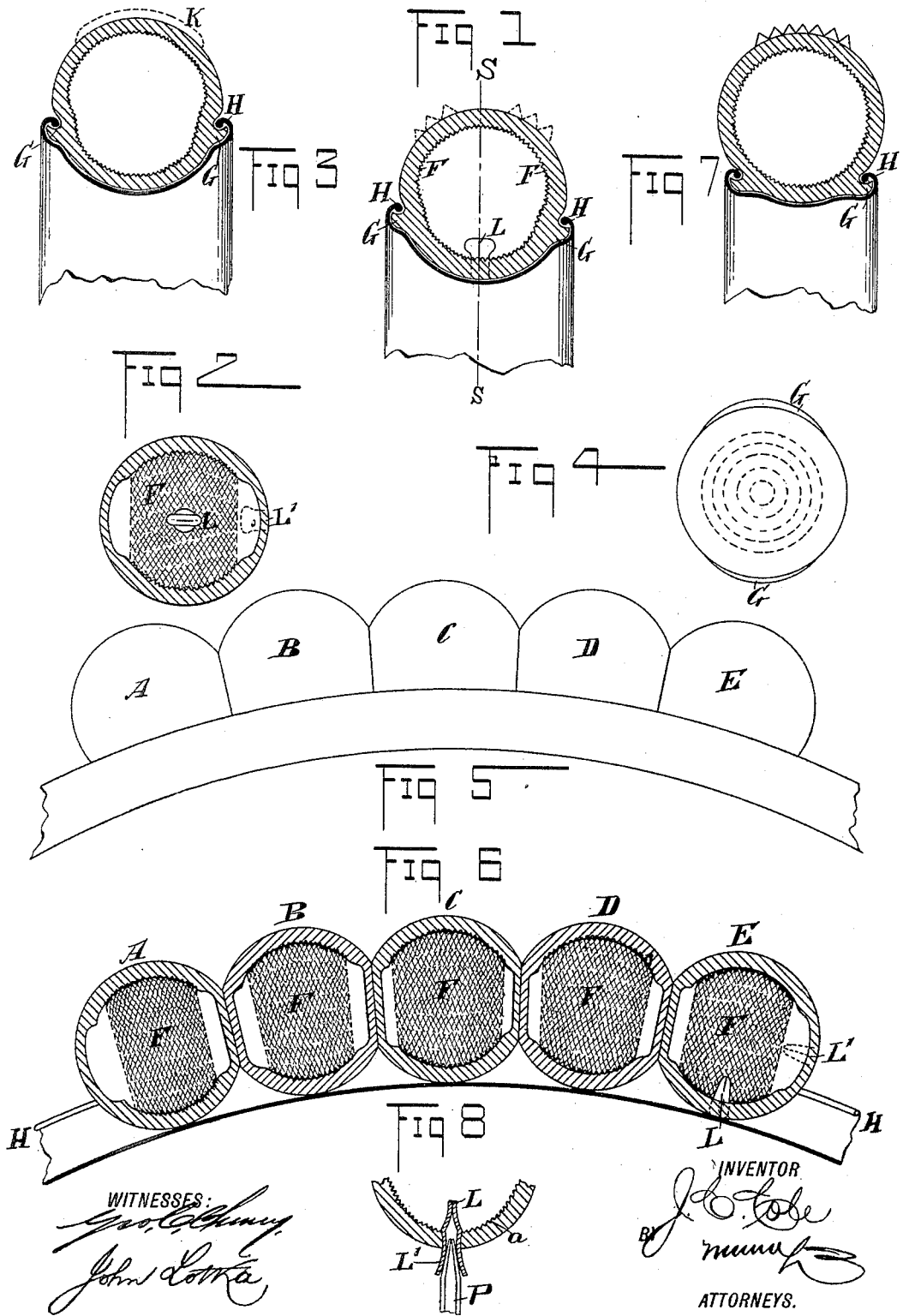

JAMES CONRAD COLE, OF LONDON, ENGLAND.

VEHICLE-TIRE.

SPECIFICATION forming part of Letters Patent No. 581,659, dated April 27, 1897.

Application filed July 10, 1896. Serial No. 598,682. (No model.)

*To all whom it may concern:*

Be it known that I, JAMES CONRAD COLE, of 33 Cecile Park, Hornsey, London, in the county of Middlesex, England, have invented certain new and useful Improvements in the Construction of Tires for Bicycles and other Vehicles, of which the following is a full, clear, and exact description.

My invention relates to improvements in the construction of elastic and pneumatic tires for bicycles and other vehicles, such tires being made of segments or balls or oblate or flattened spheroids or ovals, preferably of india-rubber. I have found that balls made for this purpose do not fully answer the requirements of a pneumatic tire, and the reasons appear to be that the imperfect elasticity of the india-rubber interferes with or detracts from the perfect elasticity of the air in the ball, and the air being under but small pressure and the balls free to expand the full value of the air under pressure is not obtained. To remove this difficulty, I make the balls so that they are differentially inextensible, or extensible only in or about the direction of the circumference of the wheel by which they are carried. For this purpose I line the balls with or work into their thickness a layer of inextensible material, or material which will stretch inappreciably under the pressure to which the air contents of the balls is subjected when made and when the vehicle is being ridden. This material may be of canvas or of other flexible but inextensible textile fabric or other material suitable for the described requirements. This lining of the ball will be of such a width that the extensible part of the ball shall be only about that which may be flattened or affected in form by contact with the adjacent balls, and the axis of the lining, which, for instance, may be in width about the diameter of the ball, will be transverse to the wheel, or in the direction of its axis, so that lateral extension is prevented.

The balls may be completely lined with a textile fabric or other suitable inextensible lining.

Provision is made for the filling of the ball with air under any desired pressure.

The thickness of the balls may be equal throughout, but preferably the thickness will vary, the parts which are pressed by the adjacent balls being the thinnest. Suitable flanges or ribs are made on the balls for their attachment to the wheel, and the tread-surface may be corrugated, roughened, or ribbed to prevent side slipping.

My invention is illustrated by the drawings hereunto attached.

In the drawings, Figure 1 is a section of a pneumatic ball as described, and Fig. 2 is a section of the same ball taken in the direction at right angles to the section of Fig. 1. Fig. 3 is a transverse section through a similar ball and wheel-rim; and Fig. 4 is a plan view of one of the balls, looking centripetally, or from the outside to the center of the wheel. Fig. 5 is a side view of a portion of a wheel as used in bicycles with the pneumatic balls A B C D E in place, the three balls B C D being mutually flattened on their adjacent surfaces, and the exterior surfaces, in the same direction, of the balls A E not being so pressed by contiguous balls are shown as having a spherical exterior due to the internal air-pressure. Fig. 6 is a circumferential section through a portion of a cycle-wheel rim and through five balls A B C D E, the section being taken on the line S S, Fig. 1. Fig. 7 is a transverse section of a modified form of the pneumatic ball and wheel-rim. Fig. 8 is a section of part of a ball, showing a self-closing rubber valve and means of inflation. It is similarly shown in Figs. 2 and 6. In Fig. 3 it is shown as incorporated within the body of the india-rubber compound.

The flange G, by which the ball is caught and held in its place in the hollow bead of the wheel-rim H, is shown in section in Figs. 1, 3, and 7 and in plan in Fig. 4, but various modifications in the form and position of this flange may be made without departing from my invention.

As shown in the various sections, the inextensible lining F of the balls may be of greater or less width, but should preferably be of a width such as that shown in Fig. 2.

In Fig. 1 the inextensible lining F of the ball is shown as incorporated with the interior india-rubber surface.

In some cases I reduce the width of that part of the ball J which is within the wheel-rim, and I may in some cases thicken the tread or part K, as indicated by dotted lines, Fig. 3, and I may also corrugate or otherwise roughen the surface at the tread by concentric or other suitable corrugations or projecting patterns. If concentric corrugations or projections are used, they may be as indicated by dotted lines in Figs. 1, 4, and 7.

The balls may be inflated with air under pressure in the course of manufacture by means known to rubber-goods manufacturers, or they may be inflated by means of an air pump or nozzle P, Fig. 8, which is inserted into the part L' of a self-closed valve L, projecting more or less from the surface $a$ of the ball, the part L' after inflation being cut off.

The valve L may be placed in the position shown in Figs. 1 and 2, and the ball E, Fig. 6, or as indicated by dotted lines at L', Fig. 2, and the ball E, Fig. 6. The said valve L may be formed with the ball by methods known to makers of rubber goods, or it may be inserted and fixed by known means, as indicated in Figs. 1, 2, and 8, the self-closing valve being a piece of small rubber tube the interiorly-projecting part of which has been flattened, so that it takes the form shown and is normally closed, but easily opened when the air is being forced in. The part L', projecting outwardly beyond the surface, is only for convenience of attachment to the pump-nozzle and may, if other means of keeping the ball and nozzle together are used, be dispensed with.

Having now particularly described and ascertained the nature of my said invention and in what manner the same is to be performed, I declare that I do not claim either use of balls generally for the construction of a segmental pneumatic tire, but What I do claim is—

1. As a new article of manufacture, a ball for sectional pneumatic tires, said ball being provided with portions constructed to fit the rim of the wheel, and having an outer spherical surface and an inner surface recessed on opposite sides, whereby the portions of the balls which engage adjacent balls when the balls are fitted on the rim will be rendered thin, substantially as described.

2. As a new article of manufacture, a ball for sectional pneumatic tires, said ball being provided with portions constructed to fit the rim of the wheel, and being provided with a comparatively inextensible lining or band on the central portion of the ball and extending transversely of the same when applied, whereby the extension of the ball in a radial direction is prevented, substantially as described.

3. As a new article of manufacture, a ball for sectional pneumatic tires, said ball being provided with portions constructed to fit the rim of the wheel, and being provided with a comparatively inextensible lining or band encircling the central portion of the ball in an approximately radial plane so as to prevent or limit the extension of the ball in a radial direction, substantially as described.

4. As a new article of manufacture, a ball for sectional pneumatic tires, said ball being provided with portions constructed to fit the rim of the wheel, being provided with a comparatively inextensible lining or band encircling the central portion of the ball in an approximately radial plane so as to prevent or limit the extension of the ball in a radial direction, the end portions of the balls being reduced in thickness, as and for the purpose set forth.

5. A sectional tire for vehicles, comprising a series of contiguous hollow balls each constructed to fit the rim of the wheel and made of reduced thickness where it engages the adjacent balls, as and for the purpose set forth.

6. A sectional tire for vehicles, comprising a series of contiguous hollow balls each constructed to fit the rim of the wheel and made of reduced thickness where it engages the adjacent balls, and a comparatively inextensible transverse band or lining arranged on the central portion of each ball in an approximately radial plane, substantially as described.

7. A sectional tire for vehicles, comprising a series of contiguous hollow balls each constructed to fit the rim of the wheel and provided with a comparatively inextensible lining extending transversely around the ball in an approximately radial plane, as and for the purpose set forth.

Dated this 9th day of June, 1896.

JAMES CONRAD COLE.

Witnesses:
DOWD DAVIS,
ROMAINE DELATOUR.